(12) United States Patent
Pendikatla et al.

(10) Patent No.: US 12,162,404 B2
(45) Date of Patent: Dec. 10, 2024

(54) SYSTEM AND METHOD FOR CREATING A VEHICLE LIGHTING ATMOSPHERE

(71) Applicant: GM GLOBAL TECHNOLOGY OPERATIONS LLC, Detroit, MI (US)

(72) Inventors: Srinath Pendikatla, Novi, MI (US); Gary J. Rushton, Warren, MI (US); Luke J. Popiel, Oxford, MI (US); Gaurav Talwar, Novi, MI (US); Anthony J. Sumcad, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 383 days.

(21) Appl. No.: 17/871,351

(22) Filed: Jul. 22, 2022

(65) Prior Publication Data
US 2024/0025336 A1   Jan. 25, 2024

(51) Int. Cl.
| | |
|---|---|
| *B60Q 1/50* | (2006.01) |
| *B60K 35/00* | (2024.01) |
| *B60K 35/10* | (2024.01) |
| *B60K 35/28* | (2024.01) |
| *B60K 35/65* | (2024.01) |
| *B60K 35/85* | (2024.01) |
| *B60Q 3/70* | (2017.01) |
| *B60Q 3/85* | (2017.01) |
| *H04W 4/02* | (2018.01) |
| *H04W 4/40* | (2018.01) |

(52) U.S. Cl.
CPC ............ *B60Q 1/5037* (2022.05); *B60K 35/00* (2013.01); *B60Q 3/70* (2017.02); *B60Q 3/85* (2017.02); *H04W 4/023* (2013.01); *H04W 4/40* (2018.02); *B60K 35/10* (2024.01); *B60K 35/28* (2024.01); *B60K 35/65* (2024.01); *B60K 35/85* (2024.01); *B60K 2360/1438* (2024.01); *B60K 2360/166* (2024.01); *B60K 2360/589* (2024.01); *B60K 2360/731* (2024.01); *B60Q 2400/20* (2013.01)

(58) Field of Classification Search
CPC .......... B60Q 1/5037; B60Q 3/70; B60Q 3/85; B60Q 2400/20; B60Q 3/208; B60Q 3/745; B60Q 3/80; B60Q 1/0023; B60Q 1/02; B60K 35/00; B60K 35/10; B60K 35/28; B60K 35/65; B60K 35/85; B60K 2360/1438; B60K 2360/166; B60K 2360/589; B60K 2360/731; H04W 4/023; H04W 4/40
See application file for complete search history.

(56) References Cited

U.S. PATENT DOCUMENTS

| | | | |
|---|---|---|---|
| 9,738,219 B1* | 8/2017 | Salter | B60Q 3/51 |
| 2007/0142988 A1* | 6/2007 | Ziehr | B60Q 3/80 |
| | | | 701/49 |
| 2021/0261050 A1* | 8/2021 | Sobhany | B60Q 3/80 |

* cited by examiner

*Primary Examiner* — Omeed Alizada
(74) *Attorney, Agent, or Firm* — Quinn IP Law (57) ABSTRACT

A system for creating vehicle lighting atmosphere of a vehicle is provided. The system includes ambient lighting including a plurality of lights configured for illuminating an interior of the vehicle or an exterior of the vehicle with a selectable light color. The system further includes a computerized vehicle lighting controller, including programming to monitor an input useful to select an ambient lighting theme, select an ambient lighting theme based upon the input, and generate a command to control the ambient lighting based upon the ambient lighting theme.

20 Claims, 6 Drawing Sheets

SYSTEM AND METHOD FOR CREATING A VEHICLE LIGHTING ATMOSPHERE

INTRODUCTION

The disclosure generally relates to a system and method for creating vehicle lighting atmosphere.

A vehicle may include lighting configured for improving a driving or riding experience for a person within the vehicle. Lighting may be interior or exterior. A color of lighting may be selected or changed in accordance with preferences of the person within the vehicle.

A vehicle navigation system may provide a current location of a vehicle, details about an environment the vehicle is traveling in, landmarks or events taking place along a route of travel, etc.

Metadata may be described as information about information. Metadata may be collected for a particular person or group of persons, for example, revealing interests or tendencies of the person or group of persons. Metadata may be collected for the public at large or portions of the public at large, for example, to describe popular trends that may be interesting to a person or persons.

SUMMARY

A system is provided for creating a vehicle lighting atmosphere of a vehicle. The system includes ambient lighting, the ambient lighting including a plurality of lights configured for illuminating an interior of the vehicle or an exterior of the vehicle with a selectable light color. The system further includes a computerized vehicle lighting controller. The vehicle lighting controller includes programming to monitor an input useful to select an ambient lighting theme, autonomously select an ambient lighting theme based upon the input, and generate a command to control the ambient lighting based upon the ambient lighting theme.

In some embodiments, the system further includes a vehicle navigation system. The input useful to select the ambient lighting theme includes a current location of the vehicle provided by the vehicle navigation system. The programming to select the ambient lighting theme selects the ambient lighting theme based upon the current location of the vehicle.

In some embodiments, the system further includes a wireless communication module configured for providing data related to the current location of the vehicle. The vehicle lighting controller further includes programming to determine proximity of a landmark or occurrence of a nearby event based upon the data related to the current location of the vehicle. The programming to select the ambient lighting theme selects the ambient lighting theme further based upon the proximity of the landmark or the occurrence of the nearby event.

In some embodiments, the system further includes a vehicle navigation system. The input useful to select the ambient lighting theme includes a selected destination of a user provided by the vehicle navigation system. The programming to select the ambient lighting theme selects the ambient lighting theme based upon the selected destination of the vehicle.

In some embodiments, the system further includes a metadata processing module configured for analyzing data related to a user of the vehicle to determine preferences of the user. The input useful to select the ambient lighting theme includes the preferences of the user.

In some embodiments, the system further includes a metadata processing module configured for analyzing public data to identify current popular trends. The input useful to select the ambient lighting theme includes the current popular trends.

In some embodiments, the system further includes a wireless communication module configured for accessing a plurality of stored ambient lighting themes from a remote server device. The input useful to select the ambient lighting theme includes one of the plurality of stored ambient lighting themes from the wireless communication module.

In some embodiments, the system further includes a touch screen display. The input useful to select the ambient lighting theme includes data from the touch screen display configured for receiving preferences of a user. The programming to select the ambient lighting theme selects one of a plurality of candidate ambient lighting themes based upon the preferences of the user.

In some embodiments, the system further includes a vehicle sensor. The input useful to select the ambient lighting theme includes data from the vehicle sensor.

In some embodiments, the system further includes a microphone device. The input useful to select the ambient lighting theme includes data from the microphone device.

In some embodiments, the ambient lighting includes a lighted headliner including a matrix of lighting facets.

In some embodiments, the vehicle lighting controller further includes programming to illuminate with the matrix of the lighting facets a lighted arrow based upon a selected destination of a user.

In some embodiments, the system further includes a vehicle navigation system and a wireless communication module. The vehicle lighting controller further includes programming to illuminate with the matrix of the lighting facets details regarding surroundings of the vehicle based upon data from the vehicle navigation system and data from the wireless communication module.

In some embodiments, the details regarding surroundings of the vehicle includes graphics representing a stellar constellation visible outside of the vehicle.

In some embodiments, the vehicle lighting controller further includes programming to control display screen outputs corresponding to the ambient lighting theme or audio outputs corresponding to the ambient lighting theme.

In some embodiments, the ambient lighting includes a transparent panel including a lighting system including circuitry or embedded light emitting diodes configured for displaying a tint, text, graphics, or colors upon the transparent panel.

In some embodiments, the vehicle lighting controller further includes programming to control the lighting system displaying the tint, the text, the graphics, or the colors upon the transparent panel based upon the ambient lighting theme.

According to one alternative embodiment, a method for creating vehicle lighting atmosphere of a vehicle is provided. The method includes operating ambient lighting including a plurality of lights configured for illuminating an interior of the vehicle or an exterior of the vehicle with a selectable light color. The method further includes, within a computerized processor, monitoring an input useful to select an ambient lighting theme, autonomously selecting an ambient lighting theme based upon the input, and generating a command to control a lighting device based upon the ambient lighting theme.

In some embodiments, monitoring the input includes monitoring a current location of the vehicle. Selecting the ambient lighting theme is based upon the current location of the vehicle.

In some embodiments, analyzing metadata related to a user of the vehicle to determine preferences of the user, and monitoring the input includes monitoring the preferences of the user.

The above features and advantages and other features and advantages of the present disclosure are readily apparent from the following detailed description of the best modes for carrying out the disclosure when taken in connection with the accompanying drawings.

DETAILED DESCRIPTION

Vehicle illumination lights and audio systems may activate based upon monitored sensor inputs. For example, if a vehicle door opens, the interior lights may activate. If the driver's seat belt is not fastened, an audible chime may sound to remind the driver to fasten the seat belt.

Ambient lighting or vehicle ambiance outputs may be a plurality of lights, lighting lamps, or other sources of light that are configured for providing a decorative projection upon one of an interior of a vehicle or the exterior of the vehicle. The ambient lighting may be illuminated in a steady, fixed pattern, or the ambient lighting may be illuminated in patterns of varying or changing intensity. The ambient lighting may include a group of alternative light sources with different colors, such that a computerized control of the ambient lighting may project alternate or multiple colors as a selectable parameter.

A system and method are provided for autonomously selecting vehicle ambiance outputs. The system and method utilize available vehicle systems to enhance the experience of the user/occupants of the vehicle, for example by generating lighting effects, graphics, and/or sounds, or operating a theme based upon available input data. Input data may be gathered from various sources, including but not limited to vehicle data (e.g., vehicle location, vehicle on-off state, door open/closed state, planned navigational route, etc.), computerized data regarding the user and/or occupants in the vehicle such as entered personal data such as age, occupation, and interests and social media data, metadata gathered by in vehicle resources or made available through a remote server device, data available through wireless communication and the Internet, such as constellations presently visible in a night sky, and multimedia resources such as music, audio and visual clips from popular shows and films, downloadable themes related to holidays, popular/local sports teams, information about current events or seasonal themes. In one embodiment, the system and method utilize various input modalities or input sources to facilitate metadata services upon interaction with events, venues, services, mobile software applications, and a current location to generate vehicle ambiance outputs.

The disclosed system and method expand upon the audio and visual effects integrated into the interior and exterior of the vehicle with initial modalities/user input included in the infotainment screen via touch and connected devices and applications. Additional modalities may include speech input through a virtual assistant, wireless software applications interacting with the user and following the user's behavior, microphone data collection, and other sensory inputs.

The disclosed system and method utilize location-based and situation-based context. Examples include utilizing directional and navigational prompts using interior lighting controls/interior lights (i.e., navigation engine expecting an imminent turn would trigger interior lighting cues) and facilitating metadata using global positioning service (GPS) location with three-dimensional map software, software or remote servers providing details of details visible to the user outside of the vehicle (e.g., landmarks, bodies of water, historical sites, details about constellations, planets, the moon, etc. In one example, a starlight headliner that illuminates using one of the 80 known stellar constellations by coordinating data regarding visible objects in the sky and an orientation of the vehicle. In another example, the system and method may provide animated feedback or acknowledgement to a user via interior/exterior lights in conjunction with audible feedback. In another example, a remote server device may provide location-based lighting effects triggered by the vehicle entering a venue associated with local/regional/world events (e.g., St. Patrick's Day celebration on March 17th would trigger green colored lighting and perhaps a clover graphics and a "Happy St. Patrick's Day!" message on the vehicle's smart glass either when the vehicle nears a parade or be the de-facto theme for the day from the minute the car is started.) In another example, the system and method may provide directed advertising based on local events and promotions. In another example, data provided to the system related to customer personality and profile-based preferences may be utilized to select lighting patterns, colors and effects (i.e., a customer's favorite theme is purple so the vehicle's underlighting, cabin lighting, may be illuminated purple).

In another example, the disclosed system and method may be utilized in combination with technology incorporating windows configured to display graphics, customizable shading and tint coloration, and other visual effects. Such window display systems may be described as smart glass applications. Smart glass applications have various integrations of circuitry and/or embedded light emitting diodes (LEDs), that allow it to auto-tint and display text, graphics, and colors as in a transparent liquid crystal display (LCD)/LED or project the tint, text, graphics, etc. upon a transparent panel of the vehicle.

In another example, the disclosed system and method may provide an enhanced driving/riding experience to the customer—as the vehicle travels it can utilize sensory and visual or camera inputs to further alert the driver and passengers to the attenuation of road hazards and conditions to improve a riding experience. The interior accent lighting can be adapted to provide warning for upcoming navigation maneuvers for a better user experience.

In another example, the disclosed system and method may provide reduced distracted driving by automatically utilizing interior lighting effects to provide information to the user. For example, the system may accept feedback from the user, rating how likely the driver is to be distracted by a particular form of display, and the system may utilize tools such as a neural network and a machine learning algorithm to provide displays most effective to provide information and avoid distraction.

In another example, the disclosed system and method may provide visual cues indicating a change or a status of autonomous, semi-autonomous, and manual operation of the vehicle. For example, an instrument panel may utilize muted or "grayed out" display characteristics with pale or lightly shaded illumination colors to indicate that the vehicle is operating under autonomous control. The same instrument panel may change to active, vibrant colors with bold character fonts and with more intense lighting effects when the vehicle changes to manual operation. In one embodiment, LED lights embedded in a steering wheel and/or other controls may selectively illuminate or pulse to emphasize activation of a manual control mode.

In another example, the disclosed system and method may provide enhanced ride sharing application potential by providing a user with information, such as displaying passenger information and ride/destination statistics and metadata statistics. The disclosed system and method may coordinate operation with a software application configured to operate on a user's smart phone and/or upon a touch screen display in the vehicle providing the user with interactive information and configurable control over the vehicle (i.e., a "MyVehicle app").

In another example, the disclosed system and method may provide enhanced social media experiences. Smart glass, infotainment displays, interior and exterior illumination, and/or LEDs may be utilized to display or invoke resonating trends and social media (e.g., memes, hashtags, colors representing movements, etc.) Data for enhanced social media experiences may be identified by user inputs (e.g., likes, upvotes, etc.) or identified through metadata. Data for enhanced social media experiences may additionally or alternatively be provided by or coordinated with membership to social groups or fan groups.

In another example, the disclosed system and method may be utilized within driverless vehicles to indicate to passengers upon entry or exit of vehicle a local direction to their destination. For example, a headliner may display an arrow vectoring the direction and distance of the destination.

Figure 1:
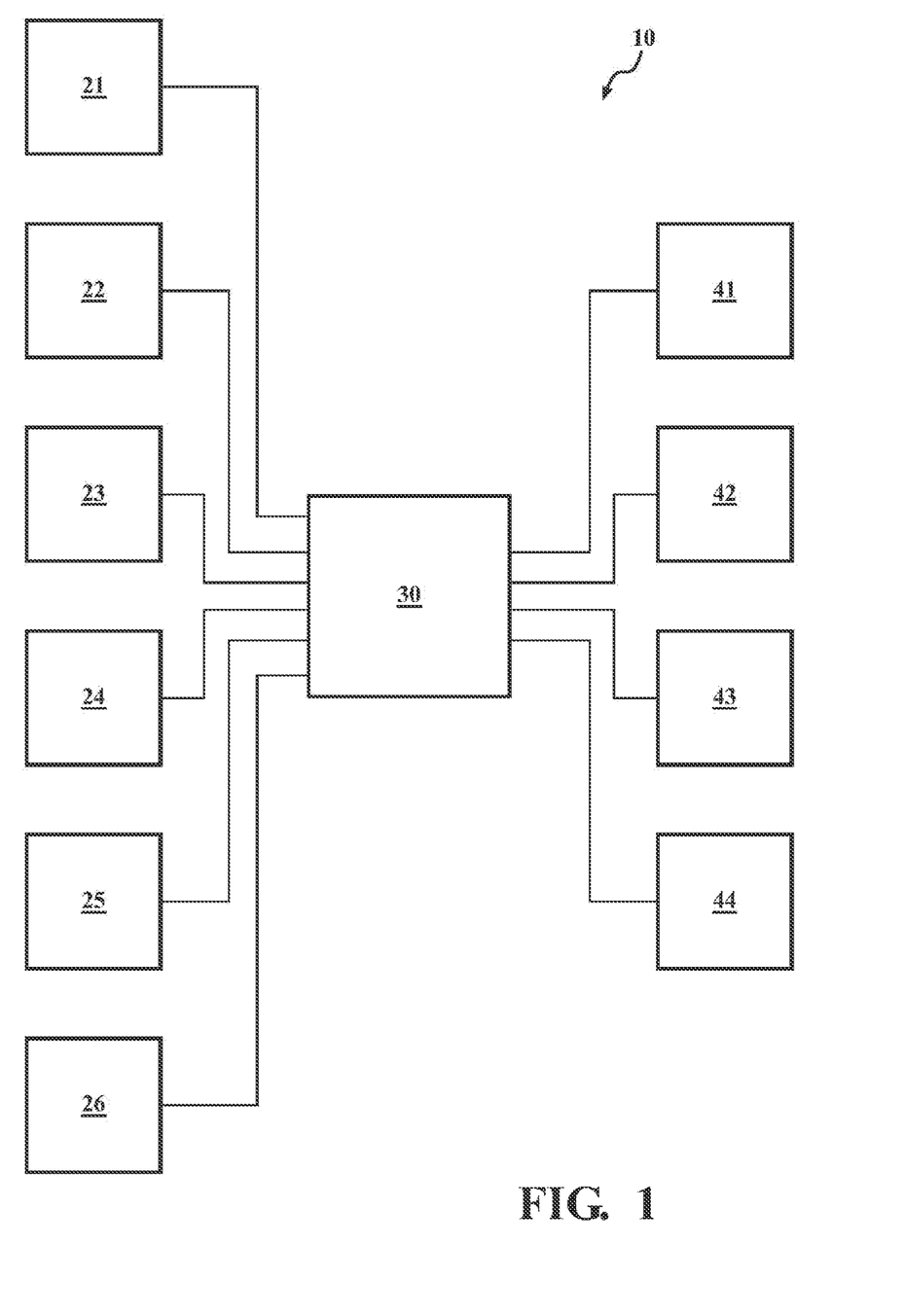
FIG. 1 schematically illustrates a system for creating vehicle lighting atmosphere, in accordance with the present disclosure.

Referring now to the drawings, wherein like reference numbers refer to like features throughout the several views, FIG. 1 schematically illustrates a system 10 for creating vehicle lighting atmosphere. The system 10 includes a computerized vehicle lighting controller 30. A number of input sources to the vehicle lighting controller 30 are illustrated, including but are not limited to a wireless communication module 21, a touch screen display 22, a vehicle navigation system 23, a metadata processing module 24, a vehicle sensor 25, and a microphone device 26. The wireless communication module 21 may include programming to access information and send and receive data over a wireless connection. In one embodiment, an ambient lighting theme may be downloaded through the wireless communication module 21 from a catalog of available themes stored upon a remote server device. The touch screen display 22 may provide a user with an ability to select a stored ambient lighting theme, approve or reject an automatically selected ambient lighting theme, and enter preferences such as favorite colors, favorite sports teams, favorite movies, etc. The vehicle navigation system 23 may provide information such as a current location of the vehicle, a planned destination of the vehicle, favorite locations for the user, and landmarks and geographical features present at different locations. The metadata processing module 24 may process information, such as emails and social media posts of the occupants of the vehicle, and/or may receive metadata information, for example, describing popular trends of population in a particular area or belonging to a particular demographic. This metadata, from whatever source, may be utilized to select an appropriate ambient lighting theme to trends with the occupants, trends popular in the culture, trends popular in a particular demographic, etc. The vehicle sensor 25 may include a number of vehicle sensors, including a camera device describing an environment within or outside the vehicle, a door sensor to describe when a person enters or leaves the vehicle, seating sensor to describe how many and which users are present in the vehicle, and/or other similar vehicle sensors. The microphone device 26 enables the system to receive voice inputs and perceive intentions and desired outcomes from the user or occupants of the vehicle. Each of the input sources may provide data to the vehicle lighting controller 30 which may be utilized to indicate or prompt selection of an appropriate or desired ambient lighting theme.

The vehicle lighting controller 30 is illustrated in communication with a number of vehicle systems configured for providing visual output control commands, for example including but not limited to an ambient interior lighting module 41 providing control over ambient lights within the vehicle, an ambient exterior lighting module 42 disposed upon an exterior of the vehicle, an infotainment system 43 including control over audio and display screen outputs corresponding to the ambient lighting theme, and an auxiliary device module 44. The auxiliary device module 44 may be useful to provide control inputs to a lighted headliner and/or a smart glass application.

The vehicle lighting controller 30 employs programming to affect the method disclosed herein to provide theme-based control over lighting, visual displays, and/or audio systems of the vehicle. Selection of an ambient lighting theme for the vehicle may be accomplished by analysis of data provided by the input sources, and may include location-based data, calendar-based data, user data, metadata, event-based data, and other types of data described herein.

Figure 2:
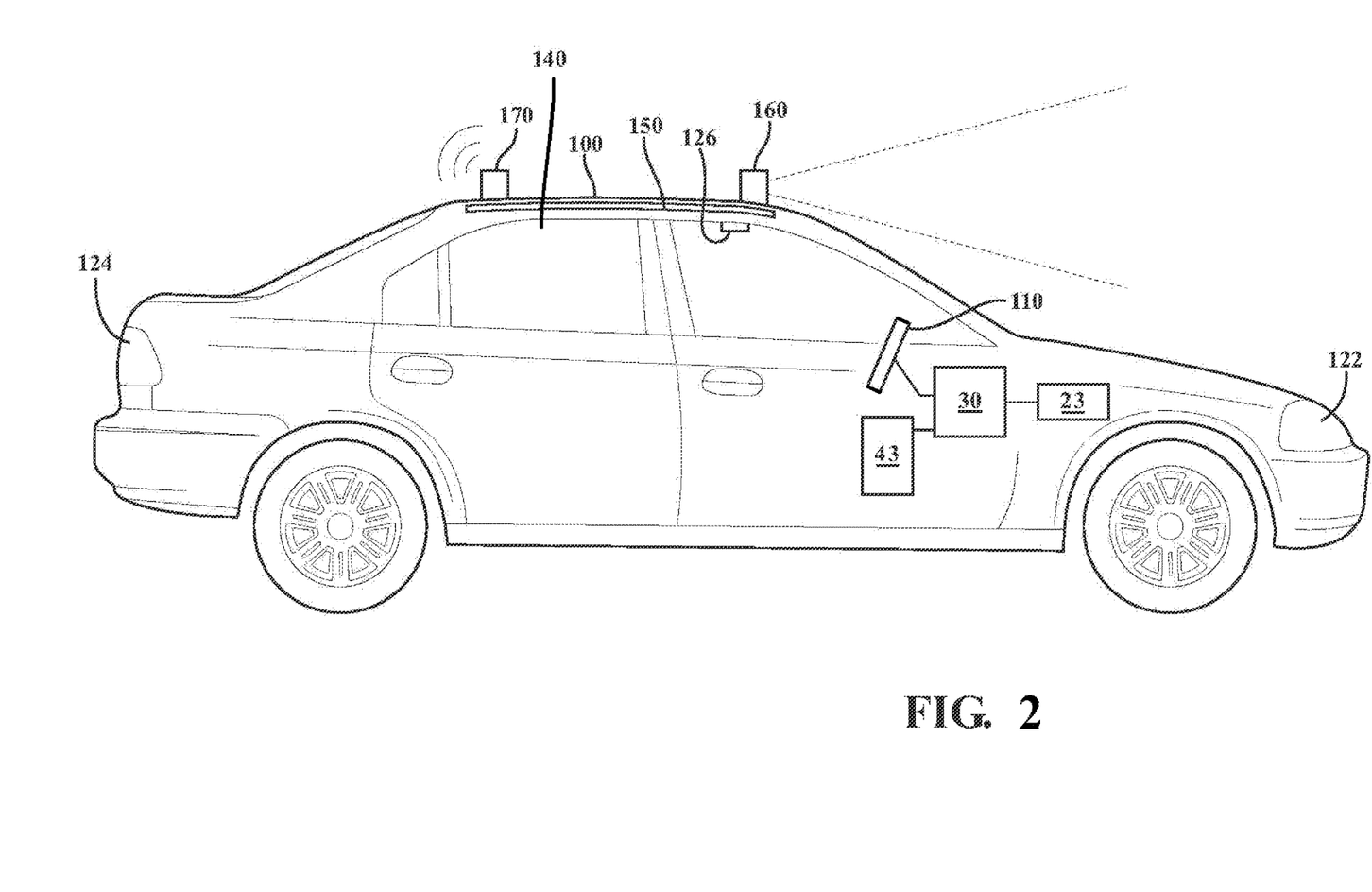
FIG. 2 schematically illustrates a device embodied as a vehicle including the system of FIG. 1, in accordance with the present disclosure.

FIG. 2 schematically illustrates a device 100 embodied as a vehicle including the system 10 of FIG. 1. The device 100 includes the system 10 of FIG. 1 including the vehicle lighting controller 30, the vehicle navigation system 23, and the infotainment system 43 of FIG. 1. The device 100 further includes a touch screen display device 110 configured to operate as the touch screen display 22 of FIG. 1, provide inputs to the vehicle lighting controller 30, and simultaneously act as an output device for the infotainment system 43. The device 100 includes exterior lamps 122 and 124 configured for providing exterior illumination in accordance with an ambient lighting theme. The exterior lamps 122 and 124 may provide lighting according to their primary purpose, providing headlight illumination and rear/braking light illumination, respectively. For example, as a user approaches a vehicle, the exterior lamps 122 and 124 may illuminate in a particular order in accordance with a theme. In another example, the exterior lamps 122 and 124 and other exterior lamps similar to the exterior lamps 122 and 124 may include auxiliary lamps or lamps pointed toward a ground near the vehicle or lamps pointed at a side of the vehicle. Such lamps may additionally or alternatively illuminated as part of an ambient lighting theme.

An interior lamp 126 is additionally illustrated. The interior lamp 126 is exemplary and may additionally or alternatively include lamps integrated into interior surfaces such as an instrument panel or door panels, lamps disposed in foot well areas, lamps integrated into a steering wheel or other control surfaces, or other similar interior lamps configured for providing ambient lighting of different colors, intensities, and lighting effects.

A lighted headliner 150 is additionally illustrated. The lighted headliner may include fiber optics and/or LED lights or other similar lighting mechanisms to enable selective lighting and display of colors shapes and other ambient lighting theme outputs upon the lighted headliner 150.

A side window 140 equipped with a smart glass application is additionally illustrated. The side window 140 may include LCD/LED electronics to provide display of graphics, shading, tint, texture, or other visual effects upon the side window 140. A window in the device 100, including a front windscreen, a rear window, and/or a panel upon a top surface of the vehicle may be similarly equipped with a smart glass application.

An external vehicle sensor 160 is additionally illustrated. The external vehicle sensor 160 may include a camera device, a light detection and ranging (LIDAR) device, or other similar device. The external vehicle sensor may be useful to provide information to the vehicle lighting controller 30, for example, providing contextual information to the vehicle lighting controller 30 such as proximity to a parade or a crowd of festival-goers, proximity to other vehicles such as an emergency vehicle, and/or existence of emergent conditions that may warrant a user taking over manual control of the vehicle.

A wireless communication system 170 is additionally illustrated. The wireless communication system 170 is configured to receive and send data over a wireless network, for example, communicating with a remote server device or accessing information on the Internet.

Figure 3:
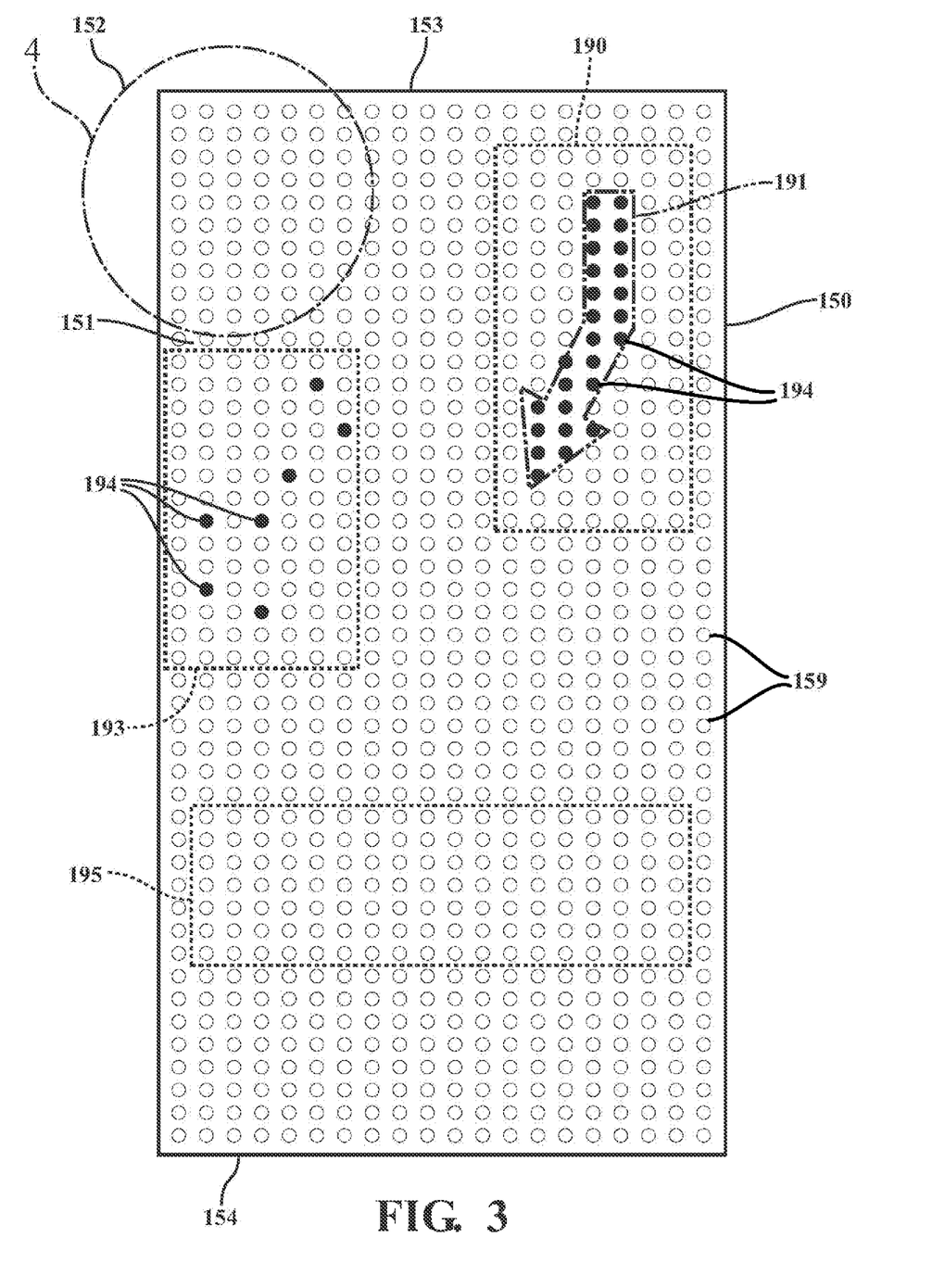
FIG. 3 schematically illustrates the lighted headliner of FIG. 2 as viewed from underneath the lighted headliner within the device, in accordance with the present disclosure.

FIG. 3 schematically illustrates the lighted headliner 150 of FIG. 2 as viewed from underneath the lighted headliner 150 within a vehicle. The lighted headliner 150 includes a surface 151 including a plurality or matrix of lighting facets 159. The lighted headliner 150 includes a front side 153 corresponding to an in-vehicle front of the lighted headliner 150 and a rear side 154 corresponding to an in-vehicle rear of the lighted headliner 150. The lighting facets 159 may include points that may selectively be illuminated, for example, by control over a plurality of LED lights or by control of a fiber optic system. Illuminated lighting facets 194 are illustrated in a first region 190, illustrating an arrow 191, for example, explaining to a user exiting the vehicle which direction the user should walk to reach a final destination. Illuminated facets 194 are illustrated in a second region 193, with a plurality of the lighted facets illustrating a constellation, the Big Dipper, which, based upon navigational data and data available over a wireless network, may be determined to be visible outside of the vehicle in the direction of the region 193 on the lighted headliner 150. A third region 195 may be defined upon the headliner 150 which may be behind the view of a driver/user of the vehicle. In this third region 195, graphics and ambient lighting in coordination with entertainment being provided to rear seat occupants may be displayed with reduced concern of distracting the driver/user.

Figure 4:
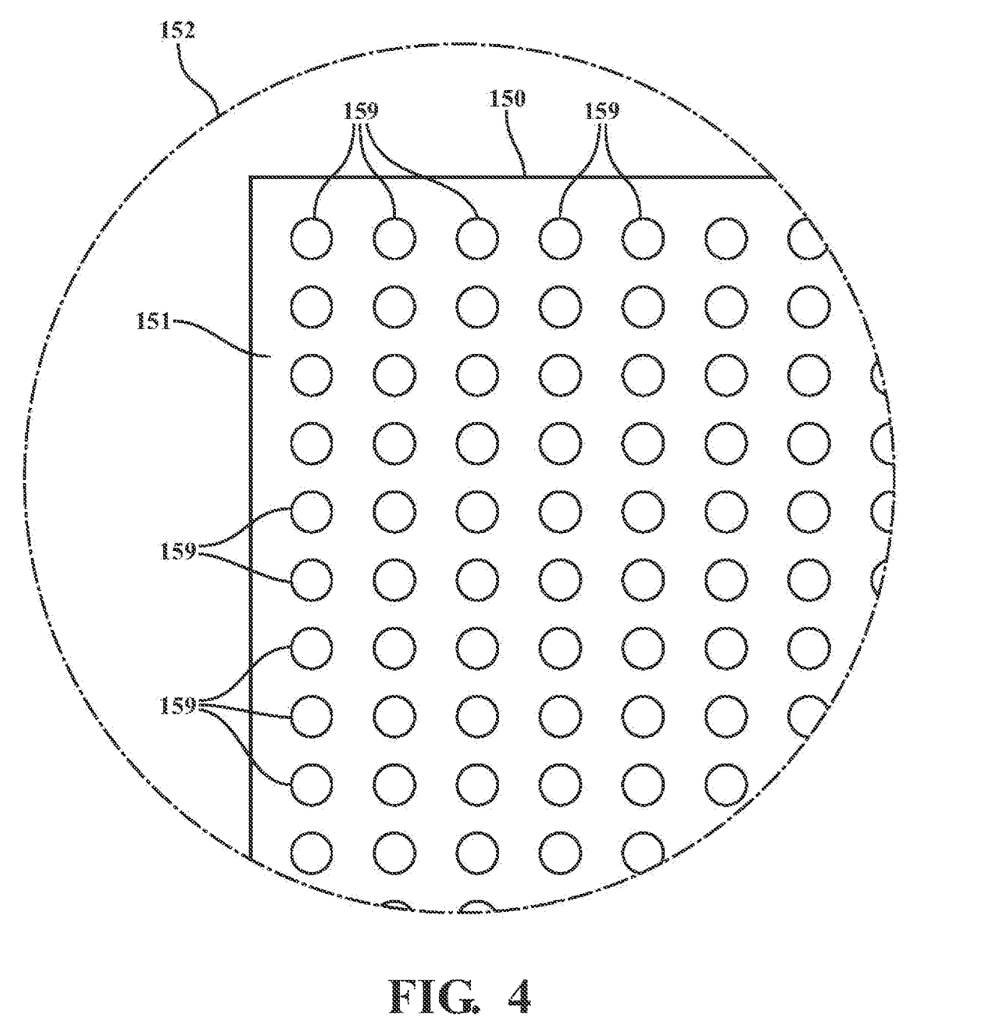
FIG. 4 schematically illustrates the portion of the lighted headliner of FIG. 3 with increased magnification, in accordance with the present disclosure.

A portion 152 of the lighted headliner 150 in FIG. 3 is illustrated in FIG. 4 with increased magnification. A plurality of lighting facets 159 are illustrated arranged in a pattern of rows and columns. The lighting facets 159 may be arranged in a pattern, may cover an entirety or a substantial entirety of the surface 151, or may cover a portion of the surface 151.

Figure 5:
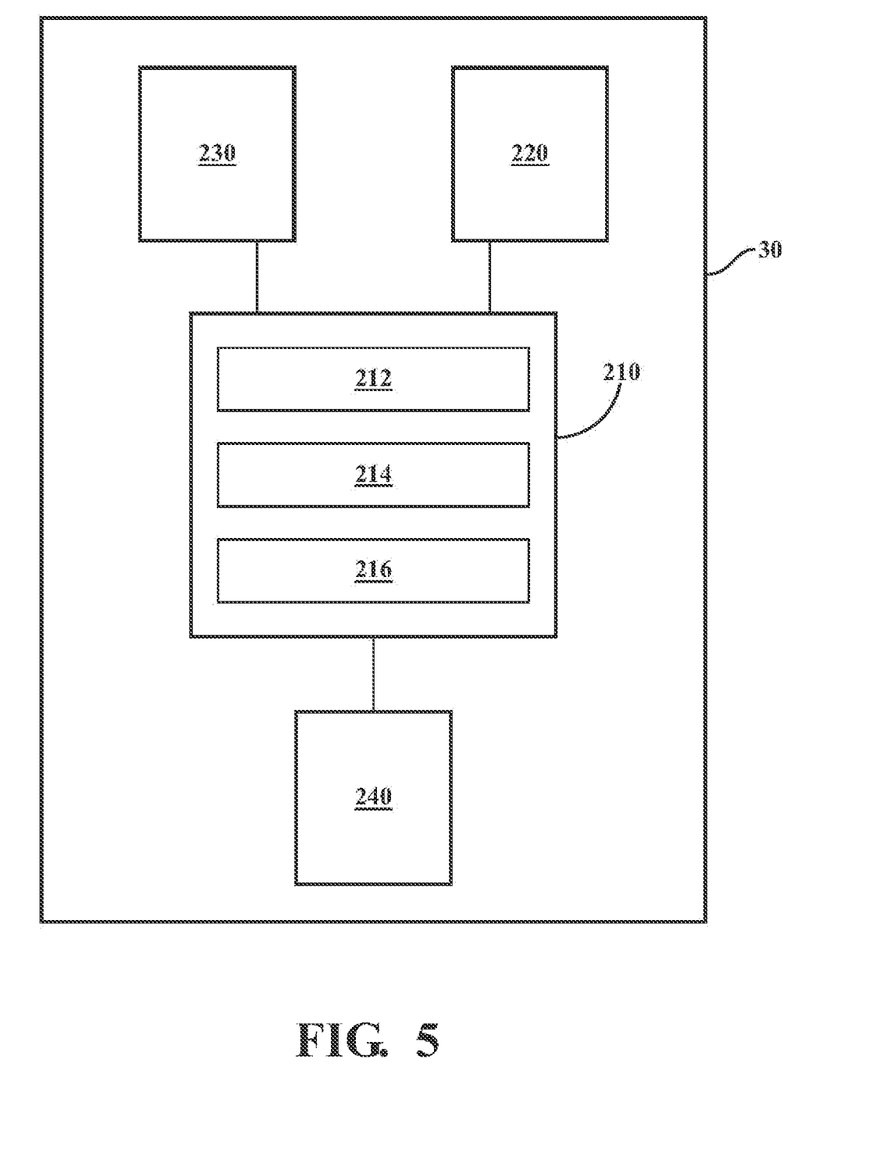
FIG. 5 schematically illustrates the computerized vehicle lighting controller of FIG. 1, in accordance with the present disclosure.

FIG. 5 schematically illustrates the computerized vehicle lighting controller 30 of FIG. 1. The computerized vehicle lighting controller 30 includes a computerized processing device 210, a communications device 220, an input output coordination device 230, and a memory storage device 240. It is noted that the computerized vehicle lighting controller 30 may include other components and some of the components are not present in some embodiments.

The processing device 210 may include memory, e.g., read only memory (ROM) and random-access memory (RAM), storing processor-executable instructions and one or more processors that execute the processor-executable instructions. In embodiments where the processing device 210 includes two or more processors, the processors may operate in a parallel or distributed manner. The processing device 210 may execute the operating system of the vehicle lighting controller 30. Processing device 210 may include one or more modules executing programmed code or computerized processes or methods including executable steps. Illustrated modules may include a single physical device or functionality spanning multiple physical devices. In the illustrative embodiment, the processing device 210 also includes an input coordination module 212, an ambient lighting theme selection module 214, and an illumination and output control module 216, which are described in greater detail below.

The communications device 220 may include a communications/data connection with a bus device configured to transfer data to different components of the system and may include one or more wireless transceivers for performing wireless communication.

The input output coordination device 230 includes hardware and/or software configured to enable the processing device 210 to receive and/or exchange data with on-board sensors of the host vehicle and to provide control of switches, modules, and processes throughout the vehicle based upon determinations made within processing device 210.

The memory storage device 240 is a device that stores data generated or received by the vehicle lighting controller 30. The memory storage device 240 may include, but is not limited to, a hard disc drive, an optical disc drive, and/or a flash memory drive.

The input coordination module 212 may include programming to monitor and coordinate data from various input sources, including but not limited to the wireless communication module 21, the touch screen display 22, the vehicle navigation system 23, the metadata processing module 24, the vehicle sensor 25, and the microphone device 26 of FIG. 1.

The ambient lighting theme selection module 214 may include programming to analyze the inputs provided to the input coordination module 212 and select an appropriate ambient lighting theme to employ through vehicle lighting and output devices based upon the inputs. The ambient lighting theme selection module 214 may include programming to receive feedback from the user, for example, confirming or rejecting a selected ambient lighting theme, accessing saved or favorite ambient lighting themes, or permitting the user to select from a plurality of candidate ambient lighting themes, for example, downloaded from a remote server device. The ambient lighting theme selection module 214 may include a learning algorithm useful to provide user or occupant specific ambient lighting themes based upon inputs and feedback from the users and occupants of the vehicle.

The illumination and output control module 216 may include programming to provide commands or electronic instructions to lighting devices or lamps throughout the vehicle. The illumination and output control module 216 may include programming to provide commands or electronic instructions to systems or sub-systems providing control over lighting devices or lamps throughout the vehicle. The illumination and output control module 216 may include programming to provide commands or electronic instructions for an infotainment system, for example, providing display details to be displayed upon a touch screen display device 110 of FIG. 2 in coordination with ambient lighting to be activated and providing audio details or programmed audio tracks to be played in coordination with the ambient lighting to be activated. The illumination and output control module 216 may include programming to provide commands or electronic instructions to an auxiliary device such as the side window 140 equipped with the smart glass application of FIG. 2 or the lighted headliner 150 of FIG. 2. The illumination and output control module 216 may include programming to control or adjust parameters of the lighting being controlled by the ambient lighting theme, for example, selecting a lighting intensity based upon a sensed ambient lighting level or based upon a time of day or enabling a user to adjust a brightness, contrast, hue, etc. of the displayed lights.

The computerized vehicle lighting controller 30 is provided as an exemplary computerized device capable of executing programmed code to operate the disclosed process. A number of different embodiments of the vehicle lighting controller 30 and modules operable therein are envisioned, and the disclosure is not intended to be limited to examples provided herein.

Figure 6:
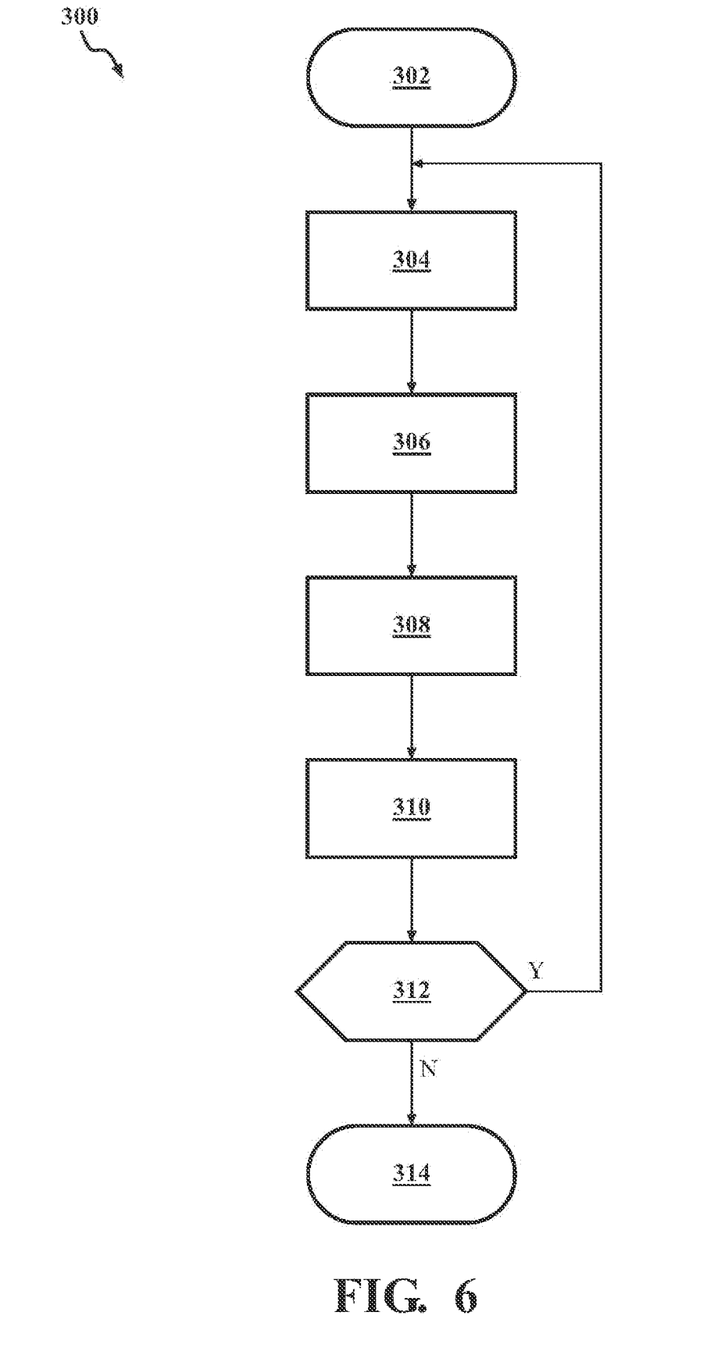
FIG. 6 is a flowchart illustrating a method for creating vehicle lighting atmosphere, in accordance with the present disclosure.

FIG. 6 is a flowchart illustrating a method 300 for creating vehicle lighting atmosphere. The method 300 starts at step 302. At step 304, data available within the vehicle that may be useful to select an ambient lighting theme is collected. The data available within the vehicle may include sensors describing how many and/or which users or occupants are present in the vehicle; a state of the vehicle and parts of the vehicle, such as an indication whether a door of the vehicle is open; a planned navigational route of the vehicle; a time of day; an ambient lighting level; and metadata that may be collected from the user/occupants of the vehicle and/or their electronic devices present in the vehicle. At step 306, data available external to the vehicle that may be useful to select an ambient lighting theme is collected. The data available external to the vehicle may include environmental details that may be collected by a camera or LIDAR device, information available from a remote server device such as metadata, and information available by accessing the Internet. At step 308, available data collected in step 304 and step 306 is analyzed and an appropriate ambient lighting theme is selected. At step 310, commands and/or electronic instructions are provided to lighting devices, lamps, and/or systems or sub-systems controlling ambient lighting within the vehicle according to the selected ambient lighting theme. At step 312, a determination is made whether the ambient lighting theme is to be changed from the selected ambient lighting theme. The change may be prompted by input from the user, movement of the vehicle to a new location that provides new inputs or data relevant to a new ambient lighting theme to be selected, or an event such as an occupant leaving the vehicle. If the ambient lighting theme is to be changed, the method 300 returns to step 304, where new data is collected. If the ambient lighting theme is not to be changed, the method advances to step 314, where the method 300 ends. The method 300 provides exemplary steps for collecting data and selecting an ambient lighting theme based upon the collected data. A number of additional or alternative steps are envisioned, and the disclosure is not intended to be limited to the examples provided.

While the best modes for carrying out the disclosure have been described in detail, those familiar with the art to which this disclosure relates will recognize various alternative designs and embodiments for practicing the disclosure within the scope of the appended claims.

What is claimed is:

1. A system for creating vehicle lighting atmosphere of a vehicle, comprising:
    ambient lighting including a plurality of lights configured for illuminating an interior of the vehicle or an exterior of the vehicle with a selectable light color, the plurality of lights including a lighted headliner including a matrix of lighting facets; and
    a computerized vehicle lighting controller, including programming to:
        monitor an input useful to select an ambient lighting theme;
        autonomously select the ambient lighting theme based upon the input;
        generate a command to control the ambient lighting based upon the ambient lighting theme; and
        illuminate a lighted arrow, via the matrix of lighting facets, based upon a selected destination of a user.

2. The system of claim 1, further comprising a vehicle navigation system;
    wherein the input useful to select the ambient lighting theme includes a current location of the vehicle provided by the vehicle navigation system; and
    wherein the programming to select the ambient lighting theme selects the ambient lighting theme based upon the current location of the vehicle.

3. The system of claim 2, further comprising a wireless communication module configured for providing data related to the current location of the vehicle;
    wherein the vehicle lighting controller further includes programming to determine proximity of a landmark or occurrence of a nearby event based upon the data related to the current location of the vehicle; and
    wherein the programming to select the ambient lighting theme selects the ambient lighting theme further based upon the proximity of the landmark or the occurrence of the nearby event.

4. The system of claim 1, further comprising a vehicle navigation system;
    wherein the input useful to select the ambient lighting theme includes a selected destination of a user provided by the vehicle navigation system; and
    wherein the programming to select the ambient lighting theme selects the ambient lighting theme based upon the selected destination of the vehicle.

5. The system of claim 1, further comprising a metadata processing module configured for analyzing data related to a user of the vehicle to determine preferences of the user;

wherein the input useful to select the ambient lighting theme includes the preferences of the user.

6. The system of claim 1, further comprising a metadata processing module configured for analyzing public data to identify current popular trends; and
wherein the input useful to select the ambient lighting theme includes the current popular trends.

7. The system of claim 1, further comprising a wireless communication module configured for accessing a plurality of stored ambient lighting themes from a remote server device; and
wherein the input useful to select the ambient lighting theme includes one of the plurality of stored ambient lighting themes from the wireless communication module.

8. The system of claim 1, further comprising a touch screen display;
wherein the input useful to select the ambient lighting theme includes data from the touch screen display configured for receiving preferences of a user; and
wherein the programming to select the ambient lighting theme selects one of a plurality of candidate ambient lighting themes based upon the preferences of the user.

9. The system of claim 1, further comprising a vehicle sensor; and
wherein the input useful to select the ambient lighting theme includes data from the vehicle sensor.

10. The system of claim 1, further comprising a microphone device; and
wherein the input useful to select the ambient lighting theme includes data from the microphone device.

11. The system of claim 1, further comprising:
a vehicle navigation system; and
a wireless communication module;
wherein the vehicle lighting controller further includes programming to illuminate with the matrix of the lighting facets details regarding surroundings of the vehicle based upon data from the vehicle navigation system and data from the wireless communication module.

12. The system of claim 11, wherein the details regarding the surroundings of the vehicle include graphics representing a stellar constellation visible outside of the vehicle.

13. The system of claim 1, wherein the vehicle lighting controller further includes programming to control display screen outputs corresponding to the ambient lighting theme or audio outputs corresponding to the ambient lighting theme.

14. The system of claim 1, wherein the ambient lighting includes a transparent panel including a lighting system including circuitry or embedded light emitting diodes configured for displaying a tint, text, graphics, or colors upon the transparent panel.

15. The system of claim 14, wherein the vehicle lighting controller further includes programming to control the lighting system displaying the tint, the text, the graphics, or the colors upon the transparent panel based upon the ambient lighting theme.

16. A method for creating vehicle lighting atmosphere of a vehicle, comprising:
operating ambient lighting, the ambient lighting including a plurality of lights configured for illuminating an interior of the vehicle or an exterior of the vehicle with a selectable light color, the plurality of lights including a lighted headliner including a matrix of lighting facets for illuminating the interior of the vehicle; and
within a computerized processor:
monitoring an input useful to select an ambient lighting theme;
autonomously selecting the ambient lighting theme based upon the input;
generating a command to control a lighting device based upon the ambient lighting theme; and
illuminating a lighted arrow, via the matrix of the lighting facets, based upon a selected destination of a user.

17. The method of claim 16, wherein monitoring the input includes monitoring a current location of the vehicle; and
wherein selecting the ambient lighting theme is based upon the current location of the vehicle.

18. The method of claim 16, further comprising analyzing metadata related to a user of the vehicle to determine preferences of the user; and
wherein monitoring the input includes monitoring the preferences of the user.

19. A system for creating vehicle lighting atmosphere of a vehicle, the system comprising:
a vehicle navigation system;
a wireless communication module;
ambient lighting, the ambient lighting including a lighted headliner comprising a matrix of lighting facets, wherein the matrix of lighting facets is configured for illuminating an interior of the vehicle with a selectable light color; and
a computerized vehicle lighting controller, including programming to:
monitor an input useful to select an ambient lighting theme;
autonomously select the ambient lighting theme based upon the input; and
generate a command to illuminate the interior of the vehicle with the ambient lighting theme, via the matrix of lighting facets, based upon data from the vehicle navigation system and data from the wireless communication module.

20. The system of claim 19, wherein the programming of the computerized vehicle lighting controller is configured to illuminate the matrix of the lighting facets as a lighted arrow based upon a selected destination of the user.

* * * * *